United States Patent
Lee et al.

(10) Patent No.: US 9,712,264 B2
(45) Date of Patent: Jul. 18, 2017

(54) METHOD OF DETERMINING A FILTER OF A RELAY AND RELAY FOR PERFORMING THE SAME

(71) Applicant: KOREA UNIVERSITY RESEARCH AND BUSINESS FOUNDATION, Seoul (KR)

(72) Inventors: InKyu Lee, Seoul (KR); Han Bae Kong, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 15/004,125

(22) Filed: Jan. 22, 2016

(65) Prior Publication Data

US 2016/0261357 A1 Sep. 8, 2016

(30) Foreign Application Priority Data

Mar. 5, 2015 (KR) .......................... 10-2015-0030740

(51) Int. Cl.
*H04B 7/04* (2017.01)
*H04B 17/40* (2015.01)
*H04B 7/0413* (2017.01)
*H04L 25/20* (2006.01)
*H04B 7/155* (2006.01)

(52) U.S. Cl.
CPC ............ *H04B 17/40* (2015.01); *H04B 7/0413* (2013.01); *H04B 7/15535* (2013.01); *H04L 25/20* (2013.01)

(58) Field of Classification Search
CPC ........ H04B 17/40; H04B 7/0413; H04B 7/14; H04L 25/20
See application file for complete search history.

(56) References Cited

U.S. PATENT DOCUMENTS

| | | | |
|---|---|---|---|
| 2016/0094285 A1* | 3/2016 | Ayoughi | H04W 16/28 370/317 |
| 2016/0219506 A1* | 7/2016 | Pratt | H04W 52/0209 |

FOREIGN PATENT DOCUMENTS

| | | |
|---|---|---|
| KR | 1020130017832 A | 2/2013 |
| KR | 1020140077758 A | 6/2014 |

* cited by examiner

*Primary Examiner* — Ross Varndell
(74) *Attorney, Agent, or Firm* — Hauptman Ham, LLP (57) ABSTRACT

A method of determining a filter of a relay and the relay for performing the same are disclosed. The method of determining a filter of a relay to minimize data estimation error in a relay environment considering a direct link includes (a) setting a power constraint condition of the relay so that maximum value of eigenvalue of a transmission covariance matrix of the relay is less than maximum transmission power usable at respective antenna; and (b) determining a transmission filter of the relay using the maximum transmission power usable at respective antenna according to the set power constraint condition.

5 Claims, 4 Drawing Sheets

METHOD OF DETERMINING A FILTER OF A RELAY AND RELAY FOR PERFORMING THE SAME

CROSS REFERENCE TO RELATED APPLICATION

This application claims the priority of Korean Patent Application No. 10-2015-0030740, filed on Mar. 5, 2015 in the KIPO (Korean Intellectual Property Office), which is incorporated herein by reference in its entirety.

TECHNICAL FIELD

The present disclosure relates to a wireless communication system, more particularly relates to a method of determining a filter of a relay in a relay system and the relay for performing the same.

BACKGROUND ART

Studies for applying a multiple-input multiple-output MIMO technique using multiple transmission/reception antennas to a relay technique have been actively progressed. For an MIMO wireless system, studies about spectrum efficiency and enhancement of communication safety have been intensively performed. Recently, a relay system is regarded as an effective technique for wireless fading lightening and enhancement of link performance. Accordingly, an MIMO relay system has been actively studied.

"MMSE based MIMO Cooperative Relaying Systems" Closed-form Designs and Outage Behavior" published in IEEE Journal on Selected Areas in Communications, vol. 30, pp. 1390-1401 (C. Song, K.-J. Lee, and I. Lee, September, 2012) was introduced as a relay transmission technique for minimizing mean squared error MSE of the conventional relay system. This considers total maximum transmission power constraint usable at a relay in a relay environment considering a direct link, particularly constrains summation of diagonal elements of a transmission covariance vector of the relay. However, this technique is not proper to apply a real system because it does not consider power constraint of respective antennas.

SUMMARY

One embodiment of the invention provides a method of determining a filter of a relay in a relay system and a relay for performing the same.

Another embodiment of the invention provides a method of determining a filter of a relay for determining a transmission filter of the relay using maximum value of eigenvalue of a transmission covariance vector of the relay and a relay for performing the same.

Still another embodiment of the invention provides a method of determining a filter of a relay for determining the filter of the relay considering constraint of the maximum transmission power usable at respective antenna and a relay for performing the same.

Still another embodiment of the invention provides a method of determining a filter of a relay for reducing considerably establishment expense and communication delay through a closed-form relay transmitting technique having low complexity and a relay for performing the same.

In one aspect, the invention provides a method of determining a filter of a relay for determining a transmission filter of the relay using maximum value of eigenvalue of a transmission covariance vector of the relay.

A method of determining a filter of a relay to minimize data estimation error in a relay environment considering a direct link according to one embodiment of the invention includes (a) setting a power constraint condition of the relay so that maximum value of eigenvalue of a transmission covariance matrix of the relay is less than maximum transmission power usable at respective antenna; and (b) determining a transmission filter of the relay using the maximum transmission power usable at respective antenna according to the set power constraint condition.

The transmission covariance matrix is calculated by using the maximum transmission power usable at respective antenna and a channel between the relay and a receiving device.

The transmission filter in the step (b) is determined by using further a channel information between the relay and a receiving device and a channel matrix.

The transmission filter is determined by using following equation.

$$F_R = \sqrt{P_{peak}} \tilde{U}_{RD} \Lambda_v^{-1/2} U_v^H \tilde{U}_\omega^H$$

Here, $F_R$ means the transmission filter of the relay, $P_{peak}$ indicates the maximum transmission power usable at respective antenna, $\tilde{U}_{RD}$ means a direction of a channel between the relay and a receiving device, $U_v^H \tilde{U}_\omega^H$ indicates a matrix calculated from a channel in the relay environment, and $\Lambda_v^{-1/2}$ means a power matrix.

The method further includes transmitting a receiving signal received from a transmitting device to a receiving device using the determined transmission filter after the step of (b).

In another aspect, the invention provides a relay for determining a transmission filter of the relay by using maximum value of eigenvalue of a transmission covariance vector of the relay.

A relay for determining a filter of a relay to minimize data estimation error in a relay environment considering a direct link according to one embodiment of the invention includes a setting unit configured to set a power constraint condition of the relay so that maximum value of eigenvalue of a transmission covariance matrix of the relay is less than maximum transmission power usable at respective antenna; and a determination unit configured to determine a transmission filter of the relay using the maximum transmission power usable at respective antenna according to the set power constraint condition.

The invention provides a method of determining a filter of a relay and a relay for performing the same, thereby determining a transmission filter of the relay using maximum value of eigenvalue of a transmission covariance vector of the relay.

The invention may determine a filter of the relay considering constraint of maximum transmission power usable at respective antennas.

The invention may reduce establishment expense of the relay and communication delay through a closed-form transmission technique of the relay having low complexity.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Example embodiments of the invention are disclosed herein. However, specific structural and functional details disclosed herein are merely representative for purposes of describing example embodiments of the invention, however, example embodiments of the invention may be embodied in many alternate forms and should not be construed as limited to example embodiments of the invention set forth herein.

It will be understood that, although the terms first, second, etc. may be used herein to describe various elements, these elements should not be limited by these terms. These terms are only used to distinguish one element from another.

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Hereinafter, various embodiments of the invention will be described in detail with reference to accompanying drawings.

Figure 1:
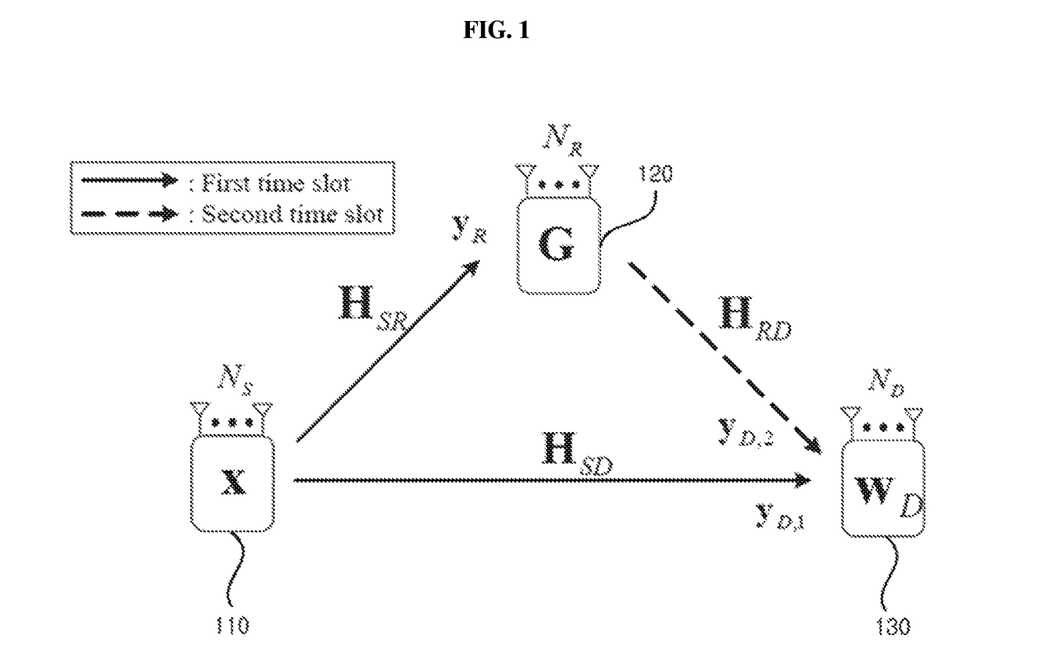
FIG. 1 is a view illustrating schematically a wireless communication system according to one embodiment of the invention.

FIG. 1 is a view illustrating schematically a wireless communication system according to one embodiment of the invention.

In FIG. 1, the wireless communication system of the present embodiment includes a transmitting device 110, a relay 120 and a receiving device 130.

It is assumed that the transmitting device 110, the relay 12 and the receiving device 130 include plural antennas, respectively. In the wireless communication system, the transmitting device 110 and the receiving device 130 may transmit or receive data through a direct link therebetween. Additionally, as shown in FIG. 1, the transmitting device 110 and the receiving device 130 may transmit or receive data through the relay 120 located therebetween.

Here, it is assumed that the relay 120 can't perform simultaneously transmission and reception of the data. Accordingly, the transmission of the data through the relay 120 may be performed by using two time slots. That is, in a first time slot, a source (e.g. transmitting device 110) may transmit data to the relay 120 and a destination (e.g. receiving device 130), respectively. Subsequently, in a second slot time, the relay 120 transmits data to the destination (receiving device 130).

Receiving signals received by each of the relay 120 and the receiving device 130 in the first time slot are expressed as equation 1 and equation 2, respectively.

$$y_R = H_{SR}x + n_R \quad \text{[Equation 1]}$$

Here, $y_R$ means the receiving signal received by the relay 120, $H_{SR} \in \mathbb{C}^{N_R \times N_S}$ indicates a channel between the transmitting device 110 and the relay 120, $N_S$ means the number of antennas of the transmitting device 110, $N_R$ indicates the number of antennas of the relay 120, $n_R \in \mathbb{C}^{N_R \times 1}$ means a complex white Gaussian noise vector where average is 0 and variance is 1 in the relay 120, and x indicates a data vector desired to be transmitted.

$$y_{D,1} = H_{SD}x + n_{D,1} \quad \text{[Equation 2]}$$

Here, $y_{D,1}$ means the receiving signal received by the receiving device 130, $H_{SD} \in \mathbb{C}^{N_D \times N_S}$ indicates a channel between the transmitting device 110 and the receiving device 130, $N_D$ means the number of antennas of the receiving $n_{D,1} \in \mathbb{C}^{N_D \times 1}$ device 130, and indicates a complex white Gaussian noise vector where average is 0 and variance is 1 in the receiving device 130.

In this case, power constraint of the transmitting device 110 is as follows; $E[xx^H] = \rho I_{N_S}$. Here, $\rho \triangleq P_T/N_S$, and $P_T$ means total power usable at the transmitting device 110.

In the second time slot, the relay 120 multiplies the receiving signal received from the transmitting device 110 in the first time slot by a filter or the relay 120, and transmits the multiplying result to the receiving device 130. The receiving signal received by the receiving device 130 may be expressed as equation 3.

$$y_{D,2} = H_{RD}G y_R + n_{D,2} \quad \text{[Equation 3]}$$

Here, $y_{D,2}$ means a receiving signal received by the receiving device 130 in the second time slot, $H_{RD} \in \mathbb{C}^{N_D \times N_R}$ indicates a channel between the relay 120 and the receiving device 130, $G \in \mathbb{C}^{N_R \times N_R}$ means the filter of the relay 120, and $n_{D,2} \in \mathbb{C}^{N_D \times 1}$ indicates a white Gaussian noise vector where average is 0 and variance is 1 (unit variance) in the receiving device 130 in the second time slot.

The receiving signals received by the receiving device 130 during two time slots (i.e. the first time slot and the second time slot) may be expressed as one vector as shown in equation 4.

$$y_D = \begin{bmatrix} y_{D,1} \\ y_{D,2} \end{bmatrix} = \begin{bmatrix} H_{SD} \\ H_{RD}GH_{SR} \end{bmatrix} x + \begin{bmatrix} n_{D,1} \\ n_D \end{bmatrix} \quad \text{[Equation 4]}$$

Here, $n_D = H_{RD}Gn_R + n_{D,2}$ means a real effective noise vector with a covariance matrix ($R_{n_D} = H_{RD}GG^H H_{RD}^H + I_{N_D}$) in the second time slot, and $I_{N_D}$ indicates an unit matrix having magnitude of $N_D$.

It is assumed in one embodiment of the invention that power constraint is set at the transmitting device 110 and the receiving device 130 and covariance of the data vector is as follows; $E[xx^H] = \rho I_{N_S}$. According to the assumption, power constraint of respective antennas of the transmitting device 110 is constant as ρ.

Finally, the receiving device 130 may estimate the transmitted data ($\hat{x} = W_D y_D$) by applying a receiving filter ($W_D \in \mathbb{C}^{N_S \times 2N_D}$).

Power constraint of the relay in the conventional technique is expressed as equation 5.

$$Tr(G(\rho H_{SR}H_{SR}^H+I_{N_R})G^H) \leq P_R \quad \text{[Equation 5]}$$

Here, $P_R$ means total power usable at the relay, and $I_{N_R}$ indicates an unit vector having magnitude of $N_R$. ith diagonal element $[G(\rho H_{SR}H_{SR}^H+I_{N_R})G^H]i$ of a transmission vector covariance $G(\rho H_{SR}H_{SR}^H+I_{N_R})G^H$ is identical to a power used at ith antenna. Accordingly, summation constraint of the diagonal elements of the covariance does not consider power constraint of respective antenna, and thus the conventional technique is not proper to apply a real system.

The power constraint of each of the antennas may be satisfied by constraining a maximum value of a power used at each of the antennas. This is expressed as equation 6.

$$\max_i [G(\rho H_{SR}H_{SR}^H+I_{N_R})G^H]_{i,i} \leq P_{peak} \quad \text{[Equation 6]}$$

Here, $P_{peak}$ indicates maximum output power usable at each of the antennas. A relay transmitting technique should be designed in consideration of the power constraint. However, it is difficult to design the relay transmitting technique in an environment considering the above complicated power constraint.

Accordingly, the system of the invention considers maximum eigenvalue constraint MVC of eigenvalue of a transmission vector covariance. That is, in one embodiment, the MVC constrains a maximum value of eigenvalue of the transmission vector covariance of the relay 120. This is expressed as equation 7.

$$\lambda_{max}(G(\rho H_{SR}H_{SR}^H+I_{N_R})G^H) \leq P_{peak} \quad \text{[Equation 7]}$$

Here, $\lambda_{max}(A)$ means the maximum value of the eigenvalue of the transmission vector covariance. The transmission vector covariance is positive semi-definite matrix, which has characteristics shown in equation 8.

$$\max_i [A]_{i,i} \leq \lambda_{max}(A) \quad \text{[Equation 8]}$$

Here, $A \in S^N$ is arbitrary semi-definite matrix. That is, the transmission vector covariance has characteristics that every engenvalue is not negative number, and the transmission vector covariance is smaller than the maximum value of the eigenvalue.

Accordingly, it is verified that the relay transmission technique considering the MVC satisfies always maximum power constraint.

Optimal receiving vector for minimizing the MSE in a relay environment including the filter of the relay 120 may be expressed as equation 9.

$$W_D = (H_{SR}^H G^H H_{RD}^H R_{n_D}^{-1} H_{RD} G H_{SR} + \Psi^{-1})^{-1} H_\omega^H \quad \text{[Equation 9]}$$

Here, $\Psi \underline{\Delta} (H_{SD}^H H_{SD} + \rho^{-1} I_{N_S})^{-1}$, and $H_\omega \underline{\Delta} [H_{SD}^T (R_{n_D}^{-1} H_{RD} G H_{SR})^T]^T$.

In one embodiment of the invention, it is assumed that the receiving device 130 uses the receiving vector shown in equation 9. If a system error vector is defined as $e \underline{\Delta} \hat{x} - x = W_D y_D - x$, an error covariance matrix $R_e(G) \underline{\Delta} E[ee^H]$ is expressed as equation 10.

$$R_e(G) = (H_{SR}^H G^H H_{RD}^H R_{n_D}^{-1} H_{RD} G H_{SR} + \Psi^{-1})^{-1} \quad \text{[Equation 10]}$$

The MSE of the system is $Tr(R_e(G))$, and the system of the invention aims at minimizing the MSE $Tr(R_e(G))$.

The filter G of the relay 120 may be always expressed as $G = G_\parallel + G_\perp$ without loss of optimality. Here, $G_\parallel$ and $G_\perp$ mean parameters including row space parallel to or vertical to $H_{SR}$ column space of components of the G, respectively. The MSE calculated by substituting $G = G_\parallel + G_\perp$ into equation 10 may be expressed with equation 11.

$$Tr(R_e(G)) = Tr\big((H_{SR}^H G_\parallel^H H_{RD}^H (H_{RD}(G_\parallel G_\parallel^H + G_\perp G_\perp^H) \times \quad \text{[Equation 11]}$$
$$H_{RD}^H + I_{N_D})^{-1} H_{RD} G_\parallel H_{SR} + \Psi^{-1})^{-1}\big) \geq$$
$$Tr\big((H_{SR}^H G_\parallel^H H_{RD}^H (H_{RD} G_\parallel G_\parallel^H H_{RD}^H +$$
$$I_{N_D})^{-1} H_{RD} G_\parallel H_{SR} + \Psi^{-1})^{-1}\big) = Tr(R_e(G_\parallel))$$

Equation 11 is an equation derived based on $A \geq B$ and $Tr(A) \geq Tr(B)$, wherein A and B are positive semi-definite matrix. The transmission covariance matrix may be expressed as equation 12.

$$G(\rho H_{SR} H_{SR}^H + I_{N_R}) G^H \quad \text{[Equation 12]}$$
$$= (G_\parallel + G_\perp)(\rho H_{SR} H_{SR}^H + I_{N_R})(G_\parallel + G_\perp)^H$$
$$= G_\parallel(\rho H_{SR} H_{SR}^H + I_{N_R}) G_\parallel^H + G_\perp G_\perp^H$$
$$\geq G_\parallel(\rho H_{SR} H_{SR}^H + I_{N_R}) G_\parallel^H.$$

Here, $A \geq B$ means $\lambda_{max}(A) \geq \lambda_{max}(B)$, and thus this may be expressed as equation 13.

$$\lambda_{max}(G(\rho H_{SR} H_{SR}^H + I_{N_R}) G^H)$$
$$\geq \lambda_{max}(G_\parallel(\rho H_{SR} H_{SR}^H + I_{N_R}) G_\parallel^H) \quad \text{[Equation 13]}$$

Hence, if loss does not exist, $G_\perp = 0$. Furthermore, $H_{SR}^H H_{SR} + H_{SD}^H H_{SD} + \rho^{-1} I_{N_S}$ has non-specific. Since the row space of $G_\parallel$ is parallel to the column space of $H_{SR}$, the filter of the relay 120 may be summarized as equation 14.

$$G = F_R W_R \quad \text{[Equation 14]}$$

Here, $W_R \underline{\Delta} (H_{SR}^H H_{SR} + H_{SD}^H H_{SD} + \rho^{-1} I_{N_S})^{-1} H_{SR}^H$, and $F_R$ indicates arbitrary matrix.

The error covariance matrix obtained by substituting equation 14 into equation 10 may be summarized as equation 15.

$$R_e(F_R) = (H_{SR}^H H_{SR} + H_{SD}^H H_{SD} + \rho^{-1} I_{N_S})^{-1} + \quad \text{[Equation 15]}$$
$$\tilde{U}_\omega (\tilde{U}_\omega^H F_R^H H_{RD}^H H_{RD} F_R \tilde{U}_\omega + \tilde{\Lambda}_\omega^{-1})^{-1} \tilde{U}_\omega^H.$$

Here, $\Omega \underline{\Delta} W_R H_{SR} \Psi$, eigenvalue decomposition of this matrix $\Omega = U_\omega \Lambda_\omega U_\omega^H$, $U_\omega$ means an unitary matrix, $\Lambda_\omega$ indicates diagonal matrix where ith diagonal element is $\lambda_{\omega,i}$ and $\lambda_{\omega,i}$ means ith eigenvalue of eigenvalues of $\Omega$ in the high order. $M = \min(N_S, N_R)$, $\tilde{U}_\omega$ indicates a matrix including first column to Mth column of $U_\omega$, and $\tilde{\Lambda}_\omega$ means upper-left $M \times M$ matrix of $\Lambda_\omega$.

Since $F_R$ affects to only the error covariance matrix which is a second term in equation 15 as shown in equation 15, the system of the invention minimizes MSE according to the error covariance matrix which is the second term in equation 15.

The method of minimizing the MSE using equation 9 to equation 15 in a relay transmitting/receiving design is summarized as equation 16.

$$\min_{F_R} \; Tr\left(\left(\tilde{U}_\omega^H F_R^H H_{RD}^H H_{RD} F_R \tilde{U}_\omega + \tilde{\Lambda}_\omega^{-1}\right)^{-1}\right) \quad \text{[Equation 16]}$$

subject to $\lambda_{max}(F_R Y F_R^H) \le P_{peak}$

Here, $Y \triangleq W_R(\rho H_{SR} H_{SR}^H + I_{N_R}) W_R^H$

EVD of $H_{RD}^H H_{RD}$, i.e. $H_{RD}^H H_{RD} = U_{RD} \Lambda_{RD} U_{RD}^H$, $U_{RD}$ means an unitary matrix, and $\Lambda_{RD}$ indicates a diagonal matrix where ith diagonal element is $\lambda_{RD,i}$. Additionally, $\lambda_{RD,i}$ means ith eigenvalue of eigenvalues of $H_{RD}^H H_{RD}$ in high order.

Accordingly, it may be proved through calculation that loss of optimality does not occur when $F_R$ has expression shown in equation 17.

$$F_R = \tilde{U}_{RD} \Phi \tilde{U}_\omega^H \quad \text{[Equation 17]}$$

Here, $\tilde{U}_{RD}$ means a matrix which is formed with first M columns of $U_{RD}$. If equation 17 is substituted into equation 16, the method of minimizing the MSE in the relay transmitting/receiving design may be again written to expression shown in equation 18.

$$\min_{\Phi_1} \; Tr\left(\left(\Phi_1^H \tilde{\Lambda}_{RD} \Phi_1 + \tilde{\Lambda}_\omega^{-1}\right)^{-1}\right) \quad \text{[Equation 18]}$$

subject to $\lambda_{max}(\Phi_1 Y_\omega \Phi_1^H) \le P_{peak}$,

Here, $Y_\omega \triangleq \tilde{U}_\omega^H Y \tilde{U}_\omega$.

Since $A \in S^N$ is arbitrary semi-definite matrix, an inequation $Tr(A^{-1}) \ge \Sigma_{i=1}^M ([A]_{i,i})^{-1}$ and an inequation $\lambda_{max}(A) \ge \max_i [A]_{i,i}$ are satisfied, wherein an equal mark is satisfied when A is a diagonal matrix. Hence, optimal solution may be obtained by searching $\Phi_1$ for diagonalizing simultaneously two matrixes $\Phi_1^H \tilde{\Lambda}_{RD} \Phi_1$ and $\Phi_1 Y_\omega \Phi_1^H$.

However, it is difficult to obtain the optimal solution in equation 18 due to off-diagonal structure of $Y_\omega$. To solve this problem, the method considers supremum of objective function in equation 18.

Relation between $\tilde{\Lambda}_\omega$ and $Y_\omega$ may be induced through following premise.

Lemma 1: upper-left part matrix $\tilde{\Lambda}_\omega \in \mathbb{C}^{M \times M}$ and $Y_\omega = \tilde{U}_\omega^H Y \tilde{U}_\omega$ of $\Lambda_\omega$ satisfy an inequation shown in equation 19.

$$\tilde{\Lambda}_\omega \le Y_\omega \quad \text{[Equation 19]}$$

The receiving signal at the relay may be expressed as equation 20 for the purpose of describing inversion of the matrix in equation 19.

$$W_R = (H_{SR}^H H_{SR} + \Psi^{-1})^{-1} H_{SR}^H \quad \text{[Equation 20]}$$
$$= \Psi H_{SR}^H (H_{SR} \Psi H_{SR}^H + I_{N_R})^{-1}$$

Equation 20 may be expressed with equation 21 by multiplying $H_{SR} \Psi H_{SR}^H + I_{N_R}$ to both sides of equation 20.

$$H_{SR} \Psi = (H_{SR} \Psi H_{SR}^H + I_{N_R}) W_R^H \quad \text{[Equation 21]}$$

Here, since $\Omega = W_R H_{SR} \Psi$, equation 21 may be again expressed as equation 22.

$$\Omega = W_R (H_{SR} \Psi H_{SR}^H + I_{N_R}) W_R^H \quad \text{[Equation 22]}$$

Here, since $A \ge B$ means $A^{-1} \le B^{-1}$, $Y = W_R(\rho H_{SR} H_{SR}^H + I_{N_R}) W_R^H$ and $\Psi = (H_{SD}^H H_{SD} + \rho^{-1} I_{N_S})^{-1} \le \rho I_{N_S}$.

Accordingly, equation 22 is expressed with an inequation shown in equation 23.

$$\Omega \le Y \quad \text{[Equation 23]}$$

Equation 19 may be obtained by multiplying $\tilde{U}_\omega$ to left side of equation 23 and multiplying $\tilde{U}_\omega$ to right side of equation 23.

The supremum of the objective function (MSE) in equation 18 may be induced by using equation 19. That is, the supremum of the objective function (MSE) in equation 18 may be expressed with equation 24 by using equation 19.

$$Tr\left(\left(\Phi_1^H \tilde{\Lambda}_{RD} \Phi_1 + \tilde{\Lambda}_\omega^{-1}\right)^{-1}\right)$$
$$\le Tr\left(\left(\Phi_1^H \tilde{\Lambda}_{RD} \Phi_1 + Y_\omega^{-1}\right)^{-1}\right) \quad \text{[Equation 24]}$$

A process of minimizing the supremum of the objective function (MSE) may be specified through equation 24. It is assumed that EVD of $S_\omega$ is $S_\omega = U_v \Lambda_v U_v^H$. Here, $U_v \in \mathbb{C}^{M \times M}$ and $\Lambda_v \in \mathbb{C}^{M \times M}$ indicate an unitary matrix and a diagonal matrix including eigenvalue $\lambda_{v,i}$ ($i=1, \ldots, M$), respectively. In this case, $\Phi_1$ may be expressed with equation 25 without general loss.

$$\Phi_1 = \tilde{\Phi} U_v^H \quad \text{[Equation 25]}$$

Here, $\tilde{\Phi} \in \mathbb{C}^{M \times M}$ arbitrary matrix.

If equation 18 is again expressed by using equation 24 and equation 25, equation 18 may be summarized with an expression shown in equation 26.

$$\min_{\tilde{\Phi}} \; Tr\left(\left(\tilde{\Phi}^H \tilde{\Lambda}_{RD} \tilde{\Phi} + \Lambda_v^{-1}\right)^{-1}\right) \quad \text{[Equation 26]}$$

subject to $\lambda_{max}(\tilde{\Phi} \Lambda_v \tilde{\Phi}^H) \le P_{peak}$.

An objective function in equation 26 is minimized when $\tilde{\Phi}^H \tilde{\Lambda}_{RD} \tilde{\Phi}$ and $\tilde{\Phi} \Lambda_v \tilde{\Phi}^H$ are diagonalized. Accordingly, if $\tilde{\Phi}$ is a diagonal matrix including a diagonal element $\phi_i$ ($i=1, \ldots, M$) without loss, equation 26 may be summarized with an expression in equation 27.

$$Tr\left(\left(\tilde{\Phi}^H \tilde{\Lambda}_{RD} \tilde{\Phi} + \Lambda_v^{-1}\right)^{-1}\right) = \quad \text{[Equation 27]}$$
$$\sum_{i=1}^M \lambda_{v,i} (1 + \lambda_{RD,i} \lambda_{v,i} |\phi_i|^2)^{-1} \ge \sum_{i=1}^M \lambda_{v,i} (1 + P_{peak} \lambda_{RD,i})^{-1}$$

Here, an inequation comes from an equation $\lambda_{max}(\tilde{\Phi} \Lambda_v \tilde{\Phi}^H) = \max_{i=1,\ldots,M}(\lambda_{v,i} |\phi_i|^2) \le P_{peak}$. Equality for the objective function is constrained to be satisfied when $\lambda_{v,i} |\phi_i|^2 = P_{peak}$ ($i=1, \ldots, M$). Accordingly, $\tilde{\Phi}$ may be again written with an expression in equation 28.

$$\tilde{\Phi} = \sqrt{P_{peak}} \Lambda_v^{-1/2} \quad \text{[Equation 28]}$$

The transmission in the relay may be determined with closed-form in equation 29, by equation 17, equation 25 and equation 28.

$$F_R = \sqrt{P_{peak}} \tilde{U}_{RD} \Lambda_v^{-1/2} U_v^H \tilde{U}_\omega^H \quad \text{[Equation 29]}$$

Here, $F_R$ means the transmission filter of the relay, $P_{peak}$ indicates maximum transmission power usable at respective antennas, $\tilde{U}_{RD}$ means a direction of the channel between the relay and the receiving device, $U_v^H \tilde{U}_\omega^H$ indicates a matrix calculated from a channel of the relay environment, and $\Lambda_v^{-1/2}$ means a power matrix. Generally, maximum power is not identical to maximum value of eigenvalue of the transmission covariance matrix due to off-diagonal structure of the transmission covariance matrix. However, a covariance matrix including $F_R$ in equation 29 and $G_R$ in equation 14 is expressed as follows; $G(\rho H_{SR}H_{SR}{}^H+I_{N_R})G^H = P_{peak}\tilde{U}_{RD}\tilde{U}_{RD}{}^H$. Accordingly, when $N_S \geq N_R$, the maximum power $\max_i[P_{peak}\tilde{U}_{RD}\tilde{U}_{RD}{}^H]_{i,i} = \lambda \max(P_{peak}\tilde{U}_{RD}\tilde{U}_{RD}{}^H) = P_{peak}$ is identical to the maximum value of the eigenvalue of the transmission covariance matrix.

Question in equation 16 should be compared with the optimal solution in view of performance, to evaluate performance of the filter of the relay of the invention. Optimal solution about the question in equation 16 is not known up to now. Accordingly, the invention induces a solution having always excellent performance than the optimal solution of the question in equation 16. Particularly, if equation 19 is substituted into equation 16, a lower bound of MVC may be induced as shown in equation 30.

$$\lambda_{max}(\Phi_1 \Upsilon_\omega \Phi_1^H) \geq \lambda_{max}(\Phi_1 \tilde{\Lambda}_\omega \Phi_1^H) \quad [\text{Equation 30}]$$

Optimization may be again written as shown in equation 31, by constraining the lower bound in equation 30.

$$\min_{\Phi_1} Tr\left(\left(\Phi_1^H \tilde{\Lambda}_{RD}\Phi_1 + \tilde{\Lambda}_\omega^{-1}\right)^{-1}\right) \quad [\text{Equation 31}]$$

subject to $\lambda_{max}(\Phi_1 \tilde{\Lambda}_\omega \Phi_1^H) \leq P_{peak}$.

Equation 31 expresses with relax power constraint of equation 16, and thus an optimal solution in equation 31 has always excellent performance than that in equation 16.

The optimal solution in equation 31 is expressed with equation 32.

$$F_R = \sqrt{P_{peak}} \tilde{U}_{RD} \tilde{\Lambda}_\omega^{-1/2} \tilde{U}_\omega{}^H \quad [\text{Equation 32}]$$

Here, $F_R$ means the transmission filter of the relay, $P_{peak}$ indicates the maximum transmission power usable at respective antennas, $\tilde{U}_{RD}$ means the direction of the channel between the relay and the receiving device, $U_v{}^H \tilde{U}_\omega{}^H$ indicates the matrix calculated from the channel in the relay environment, and $\Lambda_v^{-1/2}$ means the power matrix.

Figure 2:
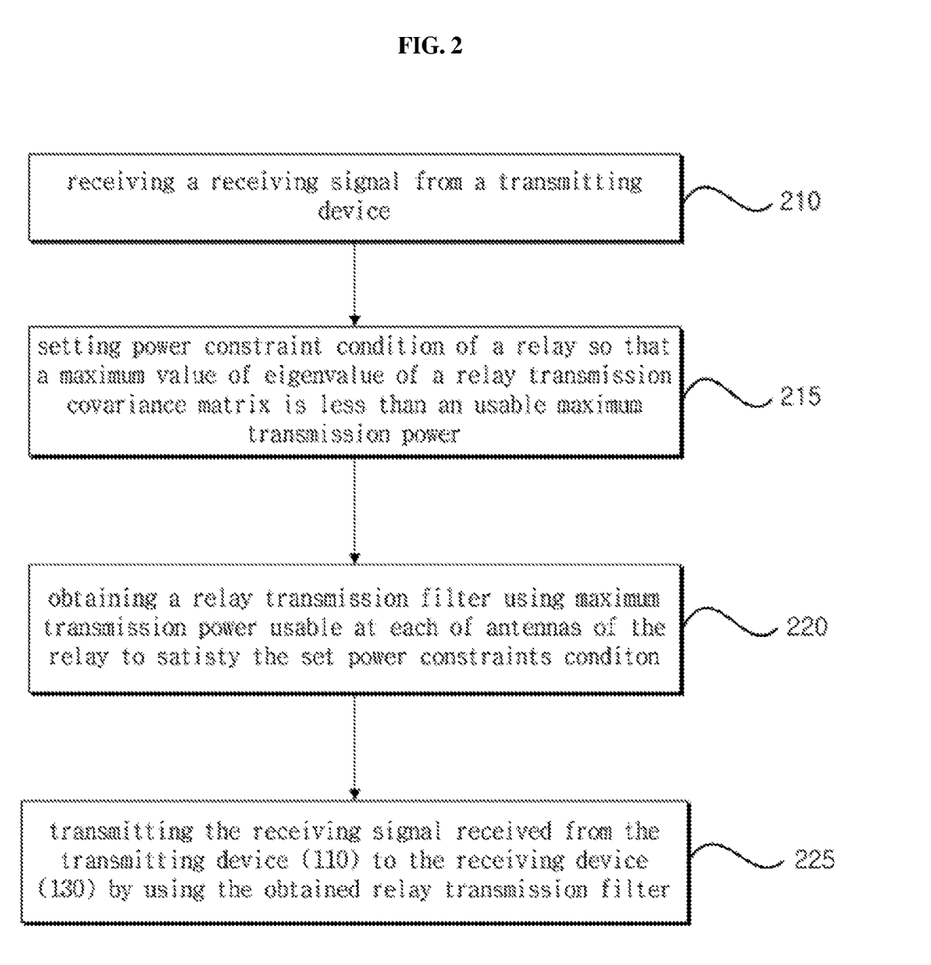
FIG. 2 is a flowchart illustrating a process of determining a filter in a relay according to one embodiment of the invention.

FIG. 2 is a flowchart illustrating a process of determining a filter in a relay according to one embodiment of the invention.

In a step of S210, the relay 120 receives the receiving signal from the transmitting device 110.

In a step of S215, the relay 120 sets power constraint condition of the relay 120 so that the maximum value of eigenvalue of a transmission covariance matrix of the relay 120 is less than maximum transmission power usable at respective antennas.

Here, eigenvalue of the transmission covariance matrix of the relay 120 may be obtained by using the maximum transmission power and the channel between the relay 120 and the receiving device 130.

In a step of S220, the relay 120 obtains the transmission filter of the relay 120 using the maximum transmission power usable at respective antennas to satisfy the set power constraint condition.

For example, the transmission filter of the relay 120 may be calculated by the maximum transmission power usable at respective antennas, the channel between the relay 120 and the receiving device 130, the power matrix and a channel matrix.

The relay 120 may obtain the transmission filter of the relay 120 as described through equation 32.

In a step of S225, the relay 120 transmits the receiving signal received from the transmitting device 110 to the receiving device 130 by using the obtained transmission filter.

Figure 3:
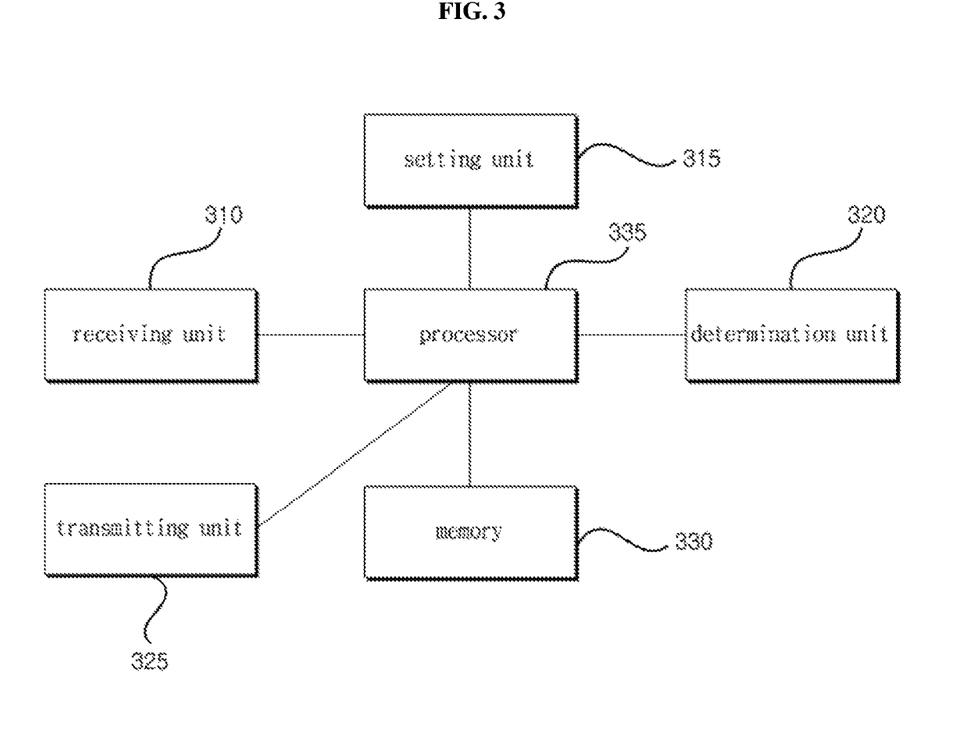
FIG. 3 is a block diagram illustrating elements in the relay according to one embodiment of the invention.
Figure 4:
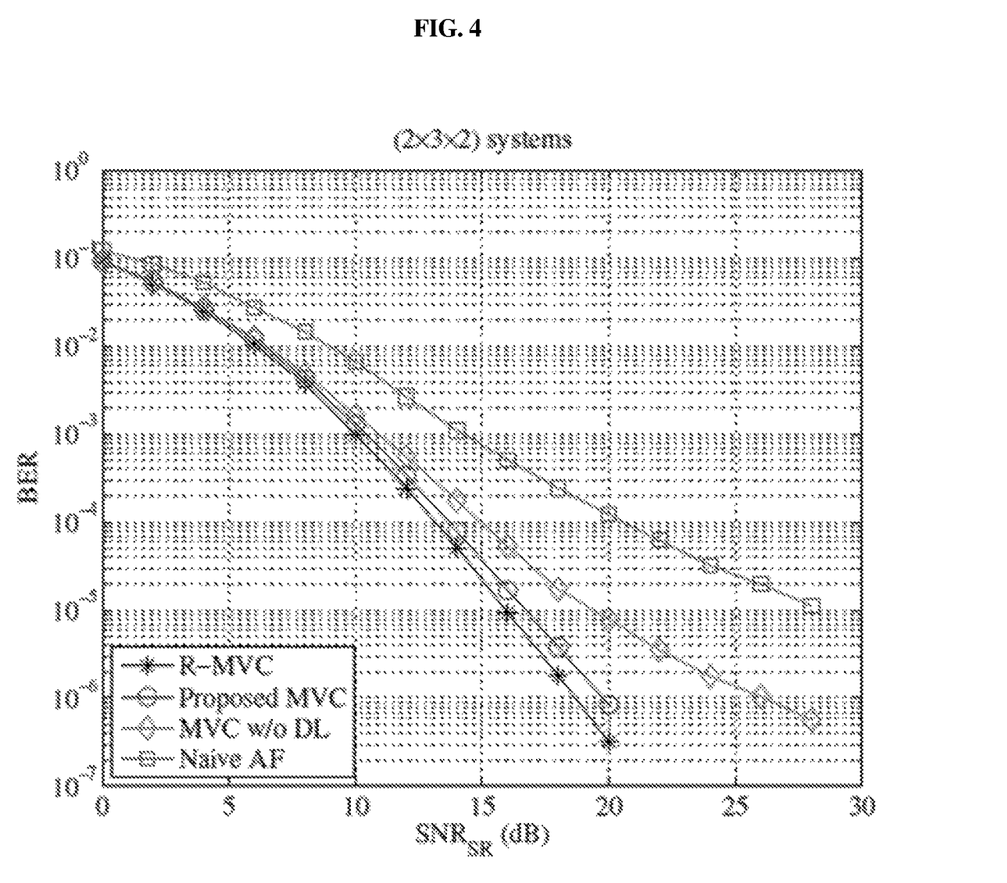
FIG. 4 is a view illustrating a graph for comparing BER performance of the conventional technique and BER performance of the invention.

FIG. 3 is a block diagram illustrating elements in the relay according to one embodiment of the invention, and FIG. 4 is a view illustrating a graph for comparing BER performance of the conventional technique and BER performance of the invention.

In FIG. 3, the relay 120 of the present embodiment includes a receiving unit 310, a setting unit 315, a determination unit 320, a transmitting unit 325, a memory 330 and a processor 335.

The receiving unit 310 receives the receiving signal received from the receiving device 130.

The setting unit 315 sets the power constraint condition of the relay 120 so that the maximum value of eigenvalue of the transmission covariance matrix of the relay 120 is less than the maximum transmission power usable at respective antennas.

The determination unit 320 determines the transmission filter of the relay 120 by using the maximum transmission power usable at respective antennas, to satisfy the set power constraint condition.

The transmitting unit 325 transmits the receiving signal received from the transmitting device 110 to the receiving device 130 using the transmission filter of the relay 120.

The memory 130 stores an algorithm for performing the method of determining the filter of the relay 120 based on the maximum value of the eigenvalue of the transmission covariance matrix of the relay 120, various data derived from the method and so on.

The processor 335 controls elements of the relay 120, e.g. the receiving unit 310, the setting unit 315, the determination unit 320, the transmitting unit 325, the memory 330, etc.

FIG. 4 shows the graph for comparing BER performance of the conventional technique and BER performance of the invention. In FIG. 4, it is assumed that SNR of the channel between the transmitting device and the relay is identical to that of the channel between the transmitting device and the receiving device, and the SNR of the channel between the relay and the receiving device is 15 dB.

As shown in FIG. 4, it is verified that the performance of the method of determining the filter of the relay based on the maximum value of the eigenvalue of the transmission covariance matrix of the relay is excellent than that in the conventional technique.

On the other hand, the method of determining the filter of the relay according to one embodiment of the invention can be implemented in the form of program instructions that may be performed using various computer means and can be recorded in a computer-readable medium. Such a computer-readable medium can include program instructions, data files, data structures, etc., alone or in combination.

Examples of the program of instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

DESCRIPTION OF REFERENCE NUMBERS

110: transmitting device
120: relay
130: receiving device
310: receiving unit
315: setting unit
320: determination unit
325: transmitting unit
330: memory
335: processor

The invention claimed is:

1. A method of determining a filter of a relay to minimize data estimation error in a relay environment considering a direct link, the method comprising:
setting a power constraint condition of the relay so that a maximum value of eigenvalue of a transmission covariance matrix of the relay is less than maximum transmission power usable at respective antenna; and
determining a transmission filter of the relay using the maximum transmission power usable at respective antenna according to the set power constraint condition,
wherein the transmission covariance matrix is calculated by using the maximum transmission power usable at respective antenna and a channel between the relay and a receiving device.

2. The method of claim 1, wherein the transmission filter in the determining of the transmission filter is determined by further using
a channel information of the channel between the relay and the receiving device, and
a channel matrix of the channel.

3. The method of claim 1, wherein the transmission filter is determined by using the following equation $$F_R = \sqrt{P_{peak}} \tilde{U}_{RD} \Lambda_v^{-1/2} U_v^H \tilde{U}_\omega^H$$

where $F_R$ means the transmission filter of the relay, $P_{peak}$ indicates the maximum transmission power usable at respective antenna, $\tilde{U}_{RD}$ means a direction of the channel between the relay and the receiving device, $U_v^H \tilde{U}_\omega^H$ indicates a matrix calculated from a channel in the relay environment, and $\Lambda_v^{-1/2}$ means a power matrix.

4. The method of claim 1, further comprising:
transmitting a receiving signal received from a transmitting device to the receiving device using the determined transmission filter after the determining of the transmission filter.

5. A relay having a filter to minimize data estimation error in a relay environment considering a direct link, the relay comprising:
a processor; and
a memory controlled by the processor,
wherein the processor is configured to
set a power constraint condition of the relay so that a maximum value of eigenvalue of a transmission covariance matrix of the relay is less than maximum transmission power usable at respective antenna, and
determine a transmission filter of the relay using the maximum transmission power usable at respective antenna according to the set power constraint condition, and
wherein the transmission covariance matrix is calculated by using the maximum transmission power usable at respective antenna and a channel between the relay and a receiving device.

* * * * *